United States Patent [19]

Chen

[11] Patent Number: 5,130,364
[45] Date of Patent: Jul. 14, 1992

[54] CHLORINATED POLYMER STAR POLYMER COMPOSITION

[75] Inventor: John C. Chen, Hockessin, Del.

[73] Assignee: E. I. Du Pont de Nemours and Company, Wilmington, Del.

[21] Appl. No.: 315,655

[22] Filed: Feb. 27, 1989

[51] Int. Cl.$^5$ .............................................. C08L 27/04
[52] U.S. Cl. ...................................... 524/472; 524/473
[58] Field of Search ........................ 524/297, 473, 472

[56] References Cited

U.S. PATENT DOCUMENTS

| | | | |
|---|---|---|---|
| 4,421,885 | 12/1983 | Tsuda et al. | 524/295 |
| 4,659,782 | 4/1987 | Spinelli | 525/293 |
| 4,659,783 | 4/1987 | Spinelli | 525/293 |

FOREIGN PATENT DOCUMENTS 58-032661 2/1983 Japan.
61-261366 11/1986 Japan.

*Primary Examiner*—Paul R. Michl
*Assistant Examiner*—John J. Guarriello

[57] ABSTRACT

A composition for use as a binder for coating compositions containing a chlorine-containing polymer having a chlorine content of 40-75 weight percent and a number average molecular weight of 3500-40,000 and an acrylic star polymer and a low molecular weight plasticizer that is a chlorinated aliphatic hydrocarbon having a chlorine content of 20-70 weight percent or a monomeric or polymer ester having molecular weights of from 200-2500.

13 Claims, No Drawings

CHLORINATED POLYMER STAR POLYMER COMPOSITION

BACKGROUND OF THE INVENTION

The present invention is directed to a novel polymer blend for use as a binder in coating compositions.

Various polymers, such as chlorinated or chlorosulfonated polyethylene, have been dissolved in solvents and mixed with conventional fillers and pigments to make coating compositions. The coating compositions must contain sufficient solids to provide adequate covering characteristics and, perhaps even more importantly, the coating when applied as a film to a substrate must be strong and capable of withstanding impact without cracking. In addition, it is often important that the coating compositions have a viscosity low enough to be readily sprayable. It is, however, also desirable to minimize the quantity of solvent for the polymer used in the coating composition in order to improve the efficiency of film build-up, and also for environmental considerations. Coating compositions containing high molecular weight polymers are known to provide better protection against impact and abrasion and have higher strength than coating compositions containing lower molecular weight polymers. However, such compositions necessarily have low solids content and they are difficult to apply on a substrate because the high molecular weight polymers result in high solution viscosities. On the other hand, employing polymers having lower molecular weights usually results in lower viscosity coating solutions, but film strength is inadequate for many uses. This invention provides a binder for coating compositions either clear or containing color pigments, especially useful for marine and industrial maintenance applications and traffic paint applications, that when mixed with one or more organic solvents and, optionally pigments and/or fillers can be readily applied to a substrate. At the same time, the coating compositions have excellent dry film properties. The compositions exhibit non-Newtonian flow behavior, i.e., the films exhibit a rapid decrease in their apparent viscosities with increasing shear. This property enables the coating compositions to have high solids content while, at the same time, they are sprayable by conventional procedures. The coating compositions have minimum solvent emission and good adhesion to the substrate on which they are applied, such as steel panels. A primary object of this invention is to provide a binder that can be used in coating compositions that have excellent tensile strength, resistance to acids, bases and solvent and that exhibit chip and impact resistance.

SUMMARY OF THE INVENTION

The present invention is directed to a composition for use as a binder for coating compositions which comprises:

(A) 100 parts by weight of a chlorine-containing polymer having a chlorine content of 40-75 weight percent, and a number average molecular weight of about 3500-40,000, preferably 7000-20,000, (B) 5-30 parts by weight of an acrylic star polymer comprising
  (1) a crosslinked core of difunctional acrylic repeat units consisting essentially of a polymer derived from one or more monomers, each monomer having at least two groups having the structure

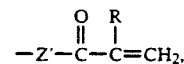

and, optionally, for the purpose of decreasing crosslink density in the core, from a small but effective amount to 99% by weight of one or more monomers each having one group

(2) attached to the core, 5-250 arms of polymer chains derived from one or more monomers, each having one group having the structure

wherein R in each of the above formulae is the same or different and is H, $CH_3$, $CH_3CH_2$, CN, or $CO_2R'$, and Z' is O or NR', wherein R' is $C_{1-4}$ alkyl; and wherein at least 50% of the molecules of the acrylic star polymer have from 5 to 250 arms, and (C) a sufficient amount of a low molecular weight plasticizer to decrease the viscosity of the composition selected from the group consisting of chlorinated aliphatic hydrocarbons having a molecular weight of from 200-2500 and a chlorine content of 20-70 weight percent and monomeric or polymeric esters having a number average molecular weight of 200-2500.

Acrylic star polymers of the type described in (B) above include soluble acrylic polymers comprising
  (1) a crosslinked core of difunctional acrylic repeat units consisting essentially of a polymer derived from one or more monomers, each monomer having at least two groups having the structure:

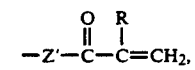

and (2) attached to the core, 5-250 arms of polymer chains derived from one or more monomers, each having one group having the structure

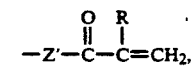

wherein each R in the above formulae is the same or different and is H, $CH_3$, $CH_3CH_2$, CN, or $CO_2R'$, and Z' is O or NR' wherein R' is $C_{1-4}$ alkyl; and wherein at least 50 percent of the molecules of the acrylic star polymer have from 5-250 arms and the ratio of the number of arms to the number of difunctional acrylic repeat units in the core is less than or equal to 1:1, and soluble is defined as nothing separates from a solution of 1 percent by weight of the acrylic star polymer in a 99 percent solvent of toluene, glyme or tetrahydrofuran upon centrifuging at 17,000 rpm for 30 minutes.

Further, the acrylic star polymer may also include those acrylic star polymers whose cores are derived from a mixture of (1) one or more monomers, each having at least two groups

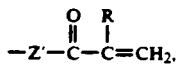

and (2) the balance comprising, for the purpose of decreasing crosslink density in the core, from a small but effective amount to 99 weight percent of one or more monomers, each having one group

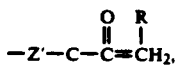

and (3) attached to the core 5-250 arms of polymer chains derived from one or more monomers, each having one group having the structure

in each of which R is the same or different and is H, $CH_3$, $CH_3CH_2$, CN or $CO_2R'$ and $Z'$ is O or $NR'$, wherein $R'$ is $C_{1-4}$ alkyl, and wherein at least 50% of the molecules of such star polymers have at least from 5 to 250 such arms being of 1 or more types, wherein:
 i. the polymer chains comprising one of the types of arms have the same or different molecular weight and are derived from the same or different monomers as the polymer chains comprising the others of said types of arms, and
 ii. the polymer chains comprising each type of arm have an arm polydispersity of 1.0 to 2.0, where said arm polydispersity is the weight average molecular weight divided by the number average molecular weight of the polymer chains of that type, and, said star polymers, comprising both core and arms of 1 or more types, have a molecular polydispersity of 1.0 to 2.0, wherein said molecular polydispersity is the weight average molecular weight divided by the number average molecular weight of the molecules.

The above-described compositions are especially useful as binders for coating compositions that can contain a high weight percent of solids in the form of fillers and pigments. The coating compositions comprise 10-55% by weight binder, based on the total weight of the composition, and one or more organic solvents for the binder, and up to about 75% by weight pigments and fillers.

The binder composition when used in paint formulations for application to a metal substrate, such as cold-rolled steel panels, has a high solids content and, at the same time, can be applied by spraying. When a thin film of the composition is applied to a substrate it has a high tensile strength, excellent impact and chip resistance and is resistant to attack by acids, bases and selective organic solvents. The film shows a strong adhesive affinity to the metal panel.

DETAILED DESCRIPTION OF THE INVENTION

The chlorine-containing polymer component of the blend contains 40-75 weight % chlorine, preferably 55-65 weight %, and a number average molecular weight of about 3500-40,000, preferably 7,000-20,000. Chlorine levels within the range disclosed promote the formation and effectiveness of chain entanglement which enhances film strength. If the chlorine level is below about 40% the glass transition temperature of the polymeric binder becomes too low and coating compositions containing the polymeric binder composition are soft and lack sufficient tensile strength to form strong films. In addition, the films are deficient in resistance to attack by acids and bases. The chlorinated polymers suitable for use in the invention include, among others, chlorinated polyethylene, chlorosulfonated polyethylene, chlorinated ethylene vinyl acetate copolymers, chlorinated polyisoprene, polyvinyl chloride, and vinylchloride copolymers with vinyl acetate, maleic anhydride, and alkyl acrylates or methacrylates. The chlorine-containing polymer component can be a single polymer or a blend of one or more chlorinated polymers having the required chlorine content.

The composition of the invention also contains one or more acrylic star polymers, preferably methyl methacrylate star shaped polymers, which act as rheology and film property modifiers as a consequence of their highly branched structures. Fortuitously, their presence in the composition also increases the ability of the coating to accept high plasticizer loadings resulting in binder compositions that can contain a high solids content without significant increase in solution viscosity. In addition, the thermodynamic compatibility of the acrylate star polymers, e.g., methyl methacrylate polymer(s), with the above described chlorine-containing polymer also allows the system to achieve a homogeneous blend. The acrylic star polymers may be homopolymers of methyl methacrylate or copolymers with copolymerizable monomers, such as styrene, butyl methacrylate, hexyl acrylate, acrylic acid, or glycidyl methacrylate. The acrylic star polymers can contain from about 20 to 100 wt % methyl methacrylate. The acrylic star polymers are prepared by "group transfer" polymerization, by which is meant a polymerization process in which polymerization of monomers having carbon-carbon double bonds is initiated by certain initiators of the formula Q-Z where Z is an activating substituent that becomes attached to one end of the growing polymer molecule and where Q is a group that continuously transfers to the other end of the growing polymer molecule as more monomer is added to the growing polymer molecule. Such polymers and their preparation are described in more detail in U.S. Pat. Nos. 4,659,782 and 4,659,783, the teachings of which are incorporated herein by reference.

The acrylic star polymers, e.g., methyl methacrylate star polymers, are present in the coating composition in the amount of 5-30 parts by weight per 100 parts chlorine-containing polymer. If less than 5 parts acrylic star polymers are present in the binder composition, then insufficient rheology and unsatisfactory film property modifications result. If greater than 30 parts acrylic star polymer are present the coating composition will have an excessively high viscosity. In addition the resultant film surface tends to be rough. The acrylic star polymers contain between 5 and 250 arms, preferably 6-35 arms. If fewer than five arms are present insufficient coating rheology and film property modification results, while if more than 250 arms are present the viscosity of the resultant coating composition will be too high. A total of 6–35 arms is preferred because it allows for the proper balance between coating, e.g., paint rheology/viscosity and film property enhancement. It is also advantageous for the arms to have a molecular weight between 3,000–30,000, preferably 5,000–25,000 for the same reasons.

The binder composition also contains a sufficient amount of a low molecular weight plasticizer to decrease the viscosity of the composition. The low molecular weight plasticizer is selected from the group consisting of chlorinated aliphatic hydrocarbons and monomeric or polymeric esters. These compounds are usually present in the amount of about 20–150 parts per 100 parts of chlorine-containing polymer. Generally, for coating compositions containing pigments, if less than about 20 parts plasticizer is present in the binder, the viscosity of the resulting coating composition will be difficult to spray. In addition, the resulting dry film will not be as resistant to cracking on impact. When more than about 150 parts of chlorinated aliphatic hydrocarbons or monomeric or polymeric esters are used resulting films are somewhat softer and not as strong. The chlorinated aliphatic hydrocarbons have molecular weights of 200–2500, preferably 400–1000, and chlorine contents of 20–70 weight percent, preferably 50–65 weight percent. The esters must be monomeric or polymeric, and have a number average molecular weight of about 200–2500. If the molecular weight of the plasticizer is too low, the final films will be too soft. If the plasticizer has a molecular weight above 2500, the binder composition when formulated into a coating composition will result in such composition having an excessively high viscosity for practical applications. The chlorine level of the chlorinated aliphatic hydrocarbon is also critical because it determines whether the chlorinated hydrocarbon will be compatible with the other resins of the composition. It also has an effect on film hardness. Among the chlorinated aliphatic hydrocarbon resins which can be used as components of the binder are "Chlorowax 50" chlorinated paraffinic plasticizer (chlorine content 48 wt.%, molecular weight 635), "Chlorowax 60-70" chlorinated paraffinic plasticizer (chlorine content 60 wt.%), and "Chlorowax LV paraffinic plasticizer (chlorine content 39 wt.%, molecular weight 545). Representative plasticizers that are esters which can be used as components of the binder composition are generally reaction products of glycols and dibasic acids. Usually the acids are straight chain, such as adipic, azelaic or sabacic with glycols being ethylene, propylene, 1,3-butylene or pentaerythritol. Such esters include dioctyl sebacate, dioctyl phthalate, butyl oleate, and trioctyl trimellitate.

The above described binders can be formulated into solvent-based coating compositions, either clear or pigmented, by any conventional means with fillers on, for example, a ball mill. The pigments used can be any of the conventional types used in coating compositions and include, for example, iron oxides, lead oxides, strontium chromate, titanium dioxide, barium sulfate, as well as color pigments, including cadmium yellow, cadmium red, chromium yellow, and metallic pigments such as aluminum flake. Conventional fillers used in coating compositions can be incorporated in the binder composition. Representative fillers include calcium carbonate, clay, talc, carbon black, coal dust.

The binder composition is mixed with fillers and pigments in one or more solvents to obtain the coating composition. The coating compositions contain about 25 to 2500 parts by weight, usually 50 to 500 parts by weight, based on 100 parts by weight of total combined chlorine-containing polymer, acrylic star polymer, e.g., methyl methacrylate polymer, and chlorinated aliphatic hydrocarbon or monomeric or polymeric ester plasticizers of one or more solvents for the binder composition. The solvent evaporates after the coating composition, e.g. paint, is applied to a substrate leaving the solid materials which forms a film or coating. The solvent is chosen so as to provide good viscosity and, if desired, sprayability characteristics. The solvent also assists in substrate wetting, promotes polymer compatibility, package stability, and coalescence or film formation. Representative solvents that can be used include aromatic hydrocarbons such as toluene and xylene, halogenated compounds such as chlorobenzene, chloroform, and methylene chloride, ketones such as methyl ethyl ketone, methyl isoamyl ketone, and methyl isobutyl ketone, ethers such as tetrahydrofuran, etc., monoethers of glycols such as the monoethers of ethylene glycol and diethylene glycol, as well as mixtures of the above. The coating composition can contain large amounts of solids which provides good covering characteristics.

In addition, antioxidants, U.V. light absorbers, corrosion inhibitors, flow control agents, and other formulating additives can be used in the coating composition, if desired. These materials are optionally present in amounts up to 90 percent by weight based on the total solids (i.e., binder resin plus pigments and fillers) in the coating composition.

The coating composition can be designed for application by spraying, although other conventional methods of coating, including brushing, dipping, and flow coating, can be employed if desired. However, the coating compositions even at high solids content are sprayable. Conventional spray techniques and equipment can be utilized in the application of the coating compositions. The compositions can be applied over any substrate including wood, metal, glass, cloth, plastics, and the like, as well as over various primers. The coating composition is particularly useful on substrates such as metal, plastics, and road surfaces.

In general, coating thickness of the composition on the substrate will vary depending upon the particular application desired. In general, coatings from 0.005–1 mm have been found to be satisfactory in most coating applications.

EXAMPLES

Test Methods

The following test methods were used:
Tensile Strength—ASTM D-412.
Elongation at Break—ASTM D-412.
Chemical Resistance—Unprimed cold rolled steel panels were coated with a binder composition containing pigment and/or fillers in a solvent applied by spraying with an air pressure pot at a pressure range between 4.5–9.0 kg. The panels were air dried at room temperature for 24 hours and then vacuum dried at 50° C. for 48 hours. For each chemical to be tested a 25 mm diameter circle was drawn on the panel and a drop of the chemical to be tested was placed within the circle. The drop was covered with a 2.5 cm plastic bottle lid to retard evaporation. After 24 hours at ambient temperature the lids were removed and the panels were washed with water to remove the test chemicals. After towel drying to remove surface residue, the panels were air dried for 24 hours and evaluated according to the following scale:

10.0—No evidence of damage
8.0—Barely detectable spot
6 0—Definite spot, but no lifting
4.0—Glossing, discoloration, etching, slight lifting or slight blistering
2.0—Definite lifting or blistering. Definite separation from substrate.
0.0—Dissolution or permanent removal of film by corrosive action.

Chip Resistance—A 10×30 cm cold rolled steel panel coated as described in the chemical resistance test is held at 0° F. (−17.8° C.) for one hour. The air pressure in a QGR Gravelometer, (available from Q Panel Co., Cleveland, Ohio), is set at 70 psi (0.4 MPa) and one pint of gravel, graded to a size 3/8-5/8 in. (0.95-1.59 cm, available from Q Panel Co.) preconditioned at 0° F. (−17.8° C.) is added to the gravelometer hopper. The steel panel is placed into the gravelometer and the gravel is projected against the panel until the test is completed. The panel is then rated on a scale of 0-10 with 10 being the highest rating to evaluate the amount of coating composition removed by the stones.

Impact Test—A coated steel panel coated as described in the chemical resistance test is placed in a Gardner Impact Tester, (available from Paul N. Gardner Co., P. 0. Box 6633, Station 9, Fort Lauderdale, FL). The weighted steel rod is raised to different calibrated heights for specific impact forces and released to impact against the panel. Both concave and convex impacts are determined on the coated side of the panel. The panel is evaluated for impact resistance by inspection for surface cracks and delamination on a scale of 0-10, with 10 being the highest range.

Grid Hatch Adhesion—A coated cold rolled steel panel, prepared as described in the chemical resistance test was scored with a series of ten parallel grooves 1 in. (2.54 cm) long and 0.1 cm apart with a gridhatch adhesion scribe (available from Paul N. Gardner Co.). A second series of grooves is scribed at a 90° angle to the first series. A strip of "Scotch" brand #610 cellophane tape, 1 in. wide is applied to cover the grid, leaving a 2 in. length of tape extending past the bottom of the grid. The tape is rubbed firmly with a pencil eraser. The tape is removed by grasping the end and sharply pulling toward the tester, parallel to the coated surface, but not in a peeling fashion. Adhesion is rated by measuring the amount of film removed on a scale of 0-10, with 10 being the highest rating.

EXAMPLE 1

A 38 liter stirred autoclave was charged with 1.0 kg ethylene vinyl acetate copolymer resin having a melt index of 2500 and a vinyl acetate content of 14 wt. %, 16 liters of carbon tetrachloride, and 4 liters of chloroform. The autoclave was closed and the pressure was set at 0.21 MPa. The reaction mixture was heated to 105° C. and held there until the resin dissolved; then addition of 2.7 ml/min initiator solution (1% 2,2'-azobis-[2-methyl-propane nitrile] in chloroform) was instituted. Chlorine gas was added to the reaction mixture at a rate of 7.7 g/minutes. After chlorine had been added for 15 minutes, the reaction temperature was lowered to 95° C. Chlorination was continued at constant catalyst and chlorine feed rate for 6.25 hours. Following a degassing step to remove the unreacted chlorine the autoclave was cooled and discharged. The reaction mixture was filtered and the chlorinated ethylene vinyl acetate copolymer was isolated by drum drying. Elemental analysis indicated that the polymer contained 58.5 wt. % chlorine. The chlorinated polymer had a number average molecular weight of about 12,000.

A branched polymethyl methacrylate acrylic star polymer was prepared as follows. A 5 liter flask equipped with a mechanical stirrer, thermometer, nitrogen inlet and addition funnels was charged with 1200.0 g toluene, 1100.0 g tetrahydrofuran, 20.19 g of 1-trimethylsiloxy-1-methoxy-2-methyl propene and 0.6 ml of a 1.0M solution of tetrabutylammonium m-chlorobenzoate in acetonitrile. Addition of two solutions was then simultaneously initiated. Feed 1 consisted of 0.6 ml of a 1.0M solution of tetrabutylammonium m-chlorobenzoate in acetonitrile and 5.0 g tetrahydrofuran; it was added over a period of 120 minutes. Feed 2 consisted of 1403.0g methyl methacrylate; it was added simultaneously with feed 1 over a period of 58 minutes. Thirty minutes after addition of feed 2 was completed, feed 3, consisting of 98.0 g ethylene glycol dimethacrylate was added over a period of 6 minutes. Thirty minutes after addition of feed 1 was completed, 64.0 g of methanol was added to quench the polymer. The resulting tetrahydrofuran and methanol were evaporated leaving the polymer in the toluene solution. The polymer had $Mn = 221,000$. The polymer solution contained 40.3% solids. The calculated Mn of the arms is 12,000. The acrylic star polymer had 18 arms and the ratio of the number of arms to the number of difunctional acrylic repeat units in the core was 4.26.

Coating compositions were prepared by mixing the materials shown in Table I, in the ratios indicated, with the binder composition of chlorinated ethylene vinyl acetate, the branched polymethyl methacrylate soluble acrylic star polymers and the plasticizers dioctyl phthalate and chlorinated paraffin. The composition was transferred to a ball mill and mixed for four days on a roller.

Film samples of the coating compositions were prepared by spraying the mixed compositions shown in Table I with an air pressure pot at a pressure of 4.5-9.0 kg onto unprimed cold rolled steel panels. The panels were air dried at room temperature for 24 hours and then vacuum dried at 50° C. for 72 hours before testing. The coating compositions were evaluated for sprayability and film properties according to the test methods described herein. Test results are summarized in Table I.

TABLE I

| | Example 1A | Example 1B |
|---|---|---|
| Coating Composition | | |
| Chlorinated Ethylene Vinyl Acetate (58.5% Cl) | 14.43 | 14.43 |
| Star Polymethyl Methacrylate[1] | 1.44 | 1.44 |
| "Chlorowax" LV[2] | 14.43 | 7.22 |
| Dioctyl Phthalate | 0 | 7.22 |
| "Fluorad" 430 Fluoroaliphatic Polymeric Ester (Dispersing Agent) | 0.12 | 0.12 |
| Barium Sulfate | 7.84 | 7.84 |
| Titanium Oxide | 12.17 | 12.17 |
| Magnesium Silicate, micronized | 19.55 | 19.55 |
| Solvesso 100 (High Flash Naptha) | 7.00 | 7.00 |

TABLE I-continued

|  | Example 1A | Example 1B |
|---|---|---|
| Xylene | 6.00 | 6.00 |
| Toluene | 3.00 | 3.00 |
| Methyl Ethyl Ketone | 14.00 | 14.00 |
| Film Properties | | |
| Tensile Strength, MPa | 4.4 | 2.2 |
| Elongation at Break, % | 23 | 34 |
| Chemical Resistance | | |
| Acids (Avg.) | 9.5 | 8.8 |
| Bases (Avg.) | 8.3 | 8.0 |
| Solvents (Avg.) | 6.7 | 6.8 |
| Chip Resistance (Gravelometer) | 9 good + | 9 good + |

| Impact | A* | B** | A | B |
|---|---|---|---|---|
| 40 lbs | 10 | 10 | 10 | 10 |
| 80 lbs | 10 | 9 | 10 | 10 |
| 120 lbs | 10 | 8 | 10 | 10 |
| 160 lbs | 9 | 7.5 | 10 | 10 |

[1] Calculated Mn of the arms = 12,000 approximate number of arms = 18
[2] 39 Wt. % Cl. MW = 545 (Chlorinated paraffin)
*Concave
**Convex

EXAMPLE 2

A star branched polymethyl methacrylate was prepared as follows. A 10 gal. (38 liter) reactor equipped with a mechanical stirrer, thermometer, nitrogen inlet and addition funnels was charged with 48.0 lb. (21.8 kg) toluene, 610.0 g of 1-(2-trimethylsiloxy)ethoxy-1-trimethylsiloxy-2-methyl propene and 16.5 ml of a 1.0M solution of tetrabutylammonium m-chlorobenzoate in acetonitrile. Addition of feed 1, consisting of 16.5 ml of a 1.0M solution of tetrabutylammonium m-chlorobenzoate in acetonitrile and 80 g of tetrahydrofuran, and feed 2, consisting of 32 lb. (14.5 kg) methyl methacrylate, was initiated simultaneously. Feed 1 was added over a period of 120 minutes, and feed 2 was added over a period of 58 minutes. Thirty minutes after the addition of feed 2 was complete addition of feed 3, consisting of 3.5 lbs (1.6 kg) of ethylene glycol dimethacrylate was initiated. Addition continued for 6 minutes. Thirty minutes after addition of feed 1 was complete 2.5 lb (1.1 kg) of methanol and 200 g of water were added and the reaction mixture was refluxed for 2 hours. Excess water and alcohol were then stripped out. The resulting star branched polymethyl methacrylate polymer had Mn=906,000. The polymer was 43.0% solids.

Coating compositions were prepared substantially as described in Example 1, from the binder containing the star branched polymethyl methacrylate of this example, the chlorinated ethylene vinyl acetate resin and plasticizers of Example 1, along with other additives in the ratios shown in Table II.

Film samples of the coating compositions were prepared as in Example 1, and the results of the physical property tests are shown in Table II.

TABLE II

|  | Example 2A | Example 2B |
|---|---|---|
| Coating Composition | | |
| Chlorinated Ethylene Vinyl Acetate (58.5% Cl) | 15.15 | 15.15 |
| Star Polymethyl Methacrylate[1] | 1.52 | 1.52 |
| "Chlorowax" LV[2] | 13.64 | 11.59 |
| Dioctyl Phthalate | 0 | 2.05 |
| "Fluorad" 430 Fluoroaliphatic Polymeric Ester | 0.13 | 0.13 |
| Barium Sulfate | 7.84 | 7.84 |
| Titanium Oxide | 12.17 | 12.17 |
| Magnesium Silicate, micronized | 19.55 | 19.55 |
| Solvesso 100 (High Flash Naptha) | 5.00 | 3.00 |
| Xylene | 8.00 | 10.00 |
| Toluene | 2.27 | 2.27 |
| Methyl Ethyl Ketone | 14.73 | 14.73 |
| Film Properties | | |
| Tensile Strength, MPa | 7.4 | 6.2 |
| Elongation at Break, % | 18 | 19 |
| Chemical Resistance | | |
| Acids (Avg.) | 9.7 | 9.7 |
| Bases (Avg.) | 8.1 | 8.1 |
| Solvents (Avg.) | 7.8 | 7.7 |
| Chip Resistance | 5 | 7 |

| Impact | A* | B** | A | B |
|---|---|---|---|---|
| 40 lbs | 10 | 10 | 10 | 10 |
| 80 lbs | 10 | 10 | 10 | 10 |
| 120 lbs | 10 | 10 | 10 | 9 |
| 160 lbs | 10 | 9 | 9 | 9 |

[1] Calculated Mn of the arms = 7200, approximate number of arms = 125.
[2] 39 wt. % Cl, MW = 545
*Concave
**Convex

EXAMPLE 3

A 38 liter stirred autoclave was charged with 1.0 kg ethylene vinyl acetate resin having a melt index of 2500 and a vinyl acetate content of 14 wt. %, 16 liters of carbon tetrachloride, and 4 liters of chloroform. The autoclave was closed and the pressure was set at 0.21 MPa. The reaction mixture was heated to 105° C. and held there until the resin dissolved; then addition of 2.7 ml/min initiator solution (1% 2,2'-azobis-2-methylpropane nitrile in chloroform) was initiated. Chlorine gas was added to the reaction mixture at a rate of 6.37 g/min. After chlorine addition had proceeded for 15 minutes, the reaction temperature was lowered to 80° C. Chlorination was continued at constant catalyst and chlorine feed rates for 8 hours. Following a degassing step to remove the unreacted chlorine the autoclave was cooled and discharged. The reaction mixture was filtered, and chlorinated ethylene vinyl acetate copolymer was isolated by drum drying. Elemental analysis indicated that the polymer contained 60 weight % chlorine.

Coating composition 3A was prepared from a binder containing the star branched polymethyl methacrylate of Example 2, the chlorinated ethylene vinyl acetate of this example, the paraffinic plastizers described in Table III and the other materials listed therein in the ratios shown therein according to the method described in Example 1. Coating composition 3B was prepared similarly, except the star branched polymethyl methacrylate of Example 1 was used in composition 3B. Film samples of coating compositions 3A and 3B were prepared substantially as described in Example 1. Results of the physical property tests are shown in Table III.

TABLE III

|  | Example 3A | Example 3B |
|---|---|---|
| Coating Composition | | |
| Chlorinated Ethylene Vinyl Acetate (58.5% Cl) | 15.15 | 15.50 |
| Star Polymethyl Methacrylate[1] | 1.52 | 0 |
| Star Polymethyl Methacrylate[2] | 0 | 2.32 |
| "Chlorowax" LV[3] | 13.64 | 0 |
| "Chlorowax" 50[4] | 0 | 11.62 |
| "Fluorad" 430 Fluoroaliphatic Polymeric Ester | 0.13 | 0.12 |
| Barium Sulfate | 7.84 | 7.62 |
| Titanium Oxide | 12.17 | 11.83 |
| Magnesium Silicate, micronized | 19.55 | 18.99 |

TABLE III-continued

|  | Example 3A | Example 3B |
|---|---|---|
| Solvesso 100 (Aromatic Solvent) | 7.00 | 7.00 |
| Xylene | 4.00 | 5.00 |
| Toluene | 2.27 | 1.74 |
| Methyl Ethyl Ketone | 16.73 | 16.31 |
| Tetrahydrofuran | 0 | 1.74 |
| Film Properties |  |  |
| Tensile Strength, MPa | 5.3 | 5.2 |
| Elongation at Break, % | 22 | 40 |
| Chemical Resistance |  |  |
| Acids (Avg.) | 9.6 | 8.8 |
| Bases (Avg.) | 8.1 | 8.0 |
| Solvents (Avg.) | 7.6 | 7.8 |
| Chip Resistance | 7 | 6 |
| Impact | A* B** | A B |
| 40 lbs | 10 10 | 10 9 |
| 80 lbs | 10 10 | 9 7.5 |
| 120 lbs | 10 10 | 8 6 |
| 160 lbs | 10 9 | 8 4 |

[1]Calculated Mn of arms = 7200, approximate number of arms = 125.
[2]Calculated Mn of arms = 12000, approximate number of arms = 18.
[3]39 wt. % Cl, MW = 545
[4]48 wt. % Cl, MW = 635
*Concave
**Convex

EXAMPLE 4

A 38 liter stirred autoclave was charged with 1.0 kg ethylene vinyl acetate copolymer having a melt index of 2500 and a vinyl acetate content of 14 wt. %, 16 liters of carbon tetrachloride, and 4 liters of chloroform. The autoclave was closed and the pressure was set at 0.21 MPa. The reaction mixture was heated to 105° C. and held there until the resin dissolved; then addition of 2.7 ml/min initiator solution (1% 2,2'-azobis-2-methylpropane nitrile in chloroform) was instituted. Chlorine gas was added to the reaction mixture at a rate of 6.37 g/min. After chlorine addition had proceeded for 15 minutes, the reaction temperature was lowered to 94° C. Chlorination was continued at constant catalyst and chlorine feed rates for 8 hours. Following a degassing step to remove the unreacted chlorine the autoclave was cooled and discharged. The reaction mixture was filtered and chlorinated ethylene vinyl acetate copolymer was isolated by drum drying. Elemental analysis indicated that the polymer contained 58 wt % chlorine.

A coating composition was prepared from a binder composed of the chlorinated ethylene vinyl acetate copolymer described above, the star branched polymethyl methacrylate of Example 1, and the chlorinated paraffinic plasticizer together with the materials listed in Table IV using the ratios shown therein. The make-up procedure was substantially the same as that described in Example 1. Physical properties of the films of the coating compositions are given in Table IV.

TABLE IV

| Coating Composition |  |
|---|---|
| Chlorinated Ethylene Vinyl Acetate (58% Cl) | 15.15 |
| Star Polymethyl Methacrylate[1] | 1.52 |
| "Chlorowax" 40[2] | 13.64 |
| "Fluorad" 430 Fluoroaliphatic Polymeric Ester | 0.13 |
| Magnesium Silicate, micronized | 11.10 |
| Zinc Chromate | 12.20 |
| Iron Oxide | 16.27 |
| Solvesso 100 (Aromatic Solvent) | 14.85 |
| Methyl Ethyl Ketone | 7.58 |
| Methyl Isoamyl Ketone | 7.58 |
| Film Properties |  |
| Chemical Resistance |  |

TABLE IV-continued

| Acids (Avg.) | 6.9 |  |
|---|---|---|
| Bases (Avg.) | 7.0 |  |
| Solvents (Avg.) | 7.0 |  |
| Grid Hatch Adhesion | 10 |  |
| Chip Resistance | 5 |  |
| Impact | Concave | Convex |
| 40 lbs | 10 | 10 |
| 80 lbs | 10 | 9 |
| 120 lbs | 10 | 8 |
| 160 lbs | 10 | 8 |

[1]Calculated Mn = 12000, approximate number of arms = 18.
[2]43 wt. % Cl, MW = 553 - chlorinated paraffin.

EXAMPLES 5, 6, and 7

Three samples of commercially available chlorine-containing polymers, UCAR-VYHD vinyl chloride copolymer (86% vinyl chloride, 14% vinyl acetate, Mn=14000, manufactured by Union Carbide Corp.), UCAR-VMCC vinyl chloride copolymer (83% vinyl chloride, 16% vinyl acetate, 1% maleic acid, Mn=15000, manufactured by Union Carbide Corp.), and "Parlon" S-10 chlorinated polyisoprene (67% chlorine, Mn=10000, manufactured by Hercules, Inc.), were used to prepare the binder compositions, along with the star branched polymethyl methacrylate polymer of Example 1, and the chlorinated paraffinic plasticizer together with the materials shown in Table V. The procedure used to make the compositions was substantially the same as that described in Example 1 and the ratios of ingredients are given in Table V. Steel test panels were prepared by coating the unprimed cold rolled steel panels with a draw down knife. The same drying procedure and test procedures described in Example 1 were repeated on the compositions. Test results are shown in Table V.

TABLE V

|  | Example 5 | Example 6 | Example 7 |
|---|---|---|---|
| Coating Composition |  |  |  |
| "UCAR-VYHD" Chlorinated Resin | 15.50 | 0 | 0 |
| "UCAR-VMCC" Chlorinated Resin | 0 | 15.50 | 0 |
| "Parlon" S-10 Chlorinated Polyisoprene | 0 | 0 | 15.50 |
| Star polymethyl Methacrylate[1] | 2.3 | 2.32 | 2.32 |
| "Fluorad" 430 Fluoroaliphatic Polymeric Ester | 0.12 | 0.12 | 0.12 |
| Barium Sulfate | 7.62 | 7.62 | 7.62 |
| Titanium Oxide | 11.83 | 11.83 | 11.83 |
| Magnesium Silicate, micronized | 18.99 | 18.99 | 18.99 |
| Solvesso 100 (High Flash Naptha) | 7.20 | 7.20 | 7.20 |
| Xylene | 5.00 | 5.00 | 5.00 |
| Tetrahydrofuran | 1.74 | 1.74 | 1.74 |
| Methyl Ethyl Ketone | 16.31 | 16.31 | 16.31 |
| Film Properties |  |  |  |
| Tensile Strength, MPa | 6.1 | 10.0 | 8.7 |
| Elongation at Break, % | 35 | 27 | 8 |
| Chemical Resistance |  |  |  |
| Acids (Avg.) | 9.9 | 9.9 | 9.2 |
| Bases (Avg.) | 9.1 | 9.3 | 7.4 |
| Solvents (Avg.) | 7.9 | 7.1 | 6.9 |
| Chip Resistance | 0 | 6 | 4 |
| Impact | A* B** | A B | A B |
| 40 lbs | 10 10 | 10 10 | 10 9 |
| 80 lbs | 10 10 | 10 10 | 9 7 |
| 120 lbs | 10 10 | 9 9 | 9 6 |

TABLE V-continued

|  | Example 5 | | Example 6 | | Example 7 | |
|---|---|---|---|---|---|---|
| 160 lbs | 10 | 10 | 9 | 9 | 9 | 6 |

[1] Calculated Mn = 12000, approximate number of arms = 18.
*Concave
**Convex

What is claimed is:

1. A composition for use as a binder for coating compositions which comprises:
   (A) 100 parts by weight of a chlorine-containing polymer having a chlorine content of about 40–75 weight percent and a number average molecular weight of 3500–40,000,
   (B) 5–30 parts by weight of an acrylic star polymer comprising
      (1) a crosslinked core of difunctional acrylic repeat units consisting essentially of a polymer derived from one or more monomers, each monomer having at least two groups having the structure:

and, optionally, for the purpose of decreasing crosslink density in the core, from a small but effective amount to 99% by weight of one or more monomers each having one group

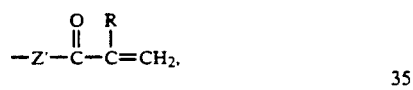

(2) attached to the core, 5–250 arms of polymer chains derived from one or more monomers, each having one group having the structure

wherein R in each of the above formulae is the same or different and is H, CH$_3$, CH$_3$CH$_2$, CN, or CO$_2$R', and Z' is O or NR' wherein R' is C$_{1-4}$ alkyl; and wherein at least 50 percent of the molecules of the acrylic star polymer have from 5–250 arms and
   (C) a sufficient amount of a low molecular weight plasticizer to decrease the viscosity of the composition selected from the group consisting of chlorinated aliphatic hydrocarbons having a molecular weight of from 200–2500 and a chlorine content of 20–70 weight percent, and monomeric or polymeric esters having a number average molecular weight of 200–2500.

2. A composition for use as a binder for coating compositions which comprises:
   (A) 100 parts by weight of a chlorine-containing polymer having a chlorine content of about 40–75 weight percent and a number average molecular weight of 3500–40,000,
   (B) 5–30 parts by weight of a soluble acrylic star polymer comprising
      (1) a crosslinked core of difunctional acrylic repeat units consisting essentially of a polymer derived from one or more monomers, each monomer having at least two groups having the structure:

and
   (2) attached to the core, 5–250 arms of polymer chains derived from one or more monomers, each having one group having the structure

wherein each R in the above formulae is the same or different and is H, CH$_3$, CH$_3$CH$_2$, CN, or CO$_2$R', and Z' is O or NR' wherein R' is C$_{1-4}$ alkyl; and wherein at least 50 percent of the molecules of the acrylic star polymer have from 5–250 arms and the ratio of the number of arms to the number of difunctional acrylic repeat units in the core is less than or equal to 1:1, and soluble is defined as nothing separates from a solution of 1 percent by weight of the acrylic star polymer in a 99 percent solvent of toluene, glyme or tetrahydrofuran upon centrifuging at 17,000 rpm for 30 minutes, and
   (C) a sufficient amount of a low molecular weight plasticizer to decrease the viscosity of the composition selected from the group consisting of chlorinated aliphatic hydrocarbons having a molecular weight of from 200–2500 and a chlorine content of 20–70 weight percent, and monomeric or polymeric esters having a number average molecular weight of 200–2500.

3. A composition for use as a binder for coating compositions which comprises:
   (A) 100 parts by weight of a chlorine-containing polymer having a chlorine content of about 40–75 weight percent and a number average molecular weight of 3500–40,000,
   (B) 5–30 parts by weight of a soluble acrylic star polymer comprising a crosslinked core of a polymer derived from a mixture of
      (1) one or more monomers, each having at least two groups

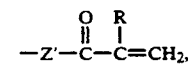

and
      (2) the balance comprising, for the purpose of decreasing crosslink density in the core, from a small but effective amount to 99 weight percent of one or more monomers, each having one group

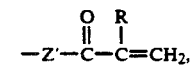

and
      (3) attached to the core 5–250 arms of polymer chains derived from one or more monomers, each having one group having the structure

in each of which R is the same or different and is H, $CH_3$, $CH_3CH_2$, CN or $CO_2R'$ and Z' is O or NR', wherein R' is $C_{1-4}$ alkyl, and wherein at least 50% of the molecules of such star polymers have at least from 5 to 250 such arms being of 1 or more types, wherein:
  i. the polymer chains comprising one of the types of arms have the same or different molecular weight and are derived from the same or different monomers as the polymer chains comprising the others of said types of arms, and
  ii. the polymer chains comprising each type of arm have an arm polydispersity of 1.0 to 2.0, where said arm polydispersity is the weight average molecular weight divided by the number average molecular weight of the polymer chains of that type, and, said star polymers, comprising both core and arms of 1 or more types, have a molecular polydispersity of 1.0 to 2.0, wherein said molecular polydispersity is the weight average molecular weight divided by the number average molecular weight of the molecules, and
(C) sufficient amount of a low molecular weight plasticizer to decrease the viscosity of the composition selected from the group consisting of chlorinated aliphatic hydrocarbons having a molecular weight of from 200–2500 and a chlorine content of 20–70 weight percent, and monomeric or polymeric esters having a number average molecular weight of 200–2500.

4. A composition of claim 1 wherein the chlorine-containing polymer has a molecular weight of from 7,000–20,000.

5. A composition of claim 1 wherein the chlorine-containing polymer contains 55–65 weight percent chlorine.

6. A compositions of claim 1 wherein the acrylic star polymer contains 6–35 arms.

7. A composition of claim 1 wherein the arms of the acrylic star polymer have a molecular weight of from 3,000–30,000.

8. A compositions of claim 1 wherein the plasticizer is a monomeric ester.

9. A composition of claim 2 wherein the chlorine-containing polymer has a molecular weight of from 7,000–20,000 and 55–65 weight percent chlorine.

10. A composition of claim 2 wherein the acrylic star polymer contains 6–35 arms and the arms have a molecular weight of 3,000–30,000.

11. A composition of claim 1 wherein the chlorine-containing polymer is chlorinated ethylene vinyl acetate.

12. A composition of claim 2 wherein the chlorine-containing polymer is chlorinated ethylene vinyl acetate.

13. A composition of claim 12 wherein the acrylic star polymer contains 6–35 arms and the arms have a molecular weight of 3,000–30,000.

* * * * *